United States Patent
Farah (10) Patent No.: US 11,082,428 B2
(45) Date of Patent: Aug. 3, 2021

(54) SYSTEMS AND METHODS FOR CLOUD-BASED NETWORK CONTROL

(71) Applicant: Control4 Corporation, Salt Lake City, UT (US)

(72) Inventor: Mina Farah, Huntington Beach, CA (US)

(73) Assignee: WirePath Home Systems, LLC, Salt Lake City, UT (US)

( * ) Notice: Subject to any disclaimer, the term of this patent is extended or adjusted under 35 U.S.C. 154(b) by 244 days.

(21) Appl. No.: 15/065,451

(22) Filed: Mar. 9, 2016

(65) Prior Publication Data
US 2016/0269412 A1    Sep. 15, 2016

Related U.S. Application Data

(60) Provisional application No. 62/130,829, filed on Mar. 10, 2015.

(51) Int. Cl.
*H04L 29/06* (2006.01)

(52) U.S. Cl.
CPC .................. *H04L 63/10* (2013.01)

(58) Field of Classification Search
CPC ......... H04L 63/19; H04L 63/10; H04L 69/22; H04L 63/08; H04L 63/0823; H04L 41/28; H04L 63/20
USPC .......................................................... 726/4
See application file for complete search history.

(56) References Cited

U.S. PATENT DOCUMENTS

| | | | |
|---|---|---|---|
| 2011/0047597 A1* | 2/2011 | Mahaffey | G06F 21/564 726/3 |
| 2013/0124328 A1* | 5/2013 | Broadhead | H04L 67/42 705/14.66 |
| 2014/0331240 A1* | 11/2014 | Zhao | G06F 9/541 719/328 |
| 2015/0033286 A1* | 1/2015 | Shahidzadeh | G06Q 20/4014 726/1 |
| 2015/0180746 A1* | 6/2015 | Day, II | H04L 51/16 455/405 |
| 2015/0279198 A1* | 10/2015 | Gu | G08B 25/08 340/541 |
| 2019/0066241 A1* | 2/2019 | Budlong | G06Q 50/165 |

* cited by examiner

*Primary Examiner* — Ashokkumar B Patel
*Assistant Examiner* — William B Jones
(74) *Attorney, Agent, or Firm* — Austin Rapp (57) ABSTRACT

A method is described. The method includes receiving an access request from a router, the router having received the access request from a client device, the client device initiating the access request to obtain access to a website or application. The method also includes sending an authorization request to an authorizing user, the authorization request comprising the access request, thereby enabling the authorizing user to see information related to the access sought to be obtained. The method further includes receiving an authorization response from the authorizing user. The method additionally includes sending the authorization response to the router, enabling the router to act on the access request.

26 Claims, 10 Drawing Sheets

SYSTEMS AND METHODS FOR CLOUD-BASED NETWORK CONTROL

RELATED APPLICATIONS

This application is related to and claims priority from U.S. Provisional Patent Application Ser. No. 62/130,829, filed Mar. 10, 2015, for "REAL-TIME CLOUD PARENTAL CONTROL," which is incorporated herein by reference.

TECHNICAL FIELD

The present disclosure relates generally to electronic devices. More specifically, the present disclosure relates to systems and methods for cloud-based network control.

BACKGROUND

In recent years, the price of electronic devices has decreased dramatically. In addition, the types of electronic devices that can be purchased have continued to increase. For example, laptop computers, tablets, smart phones, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources.

Some electronic devices may access network resources such as websites and applications. Controlling access to network resources may be a concern. For example, in a parental control context, a parent may want to control what a child can access using a networked device. Similarly, businesses may wish to control what network resources an employee can access. Additionally, network control for remote authorizing users provides additional challenges. As illustrated by this discussion, systems and methods for cloud-based network control may be beneficial.

DETAILED DESCRIPTION

A method is described. The method includes receiving an access request from a router, the router having received the access request from a client device, the client device initiating the access request to obtain access to a website or application. The method also includes sending an authorization request to an authorizing user, the authorization request comprising the access request, thereby enabling the authorizing user to see information related to the access sought to be obtained. The method further includes receiving an authorization response from the authorizing user. The method additionally includes sending the authorization response to the router, enabling the router to act on the access request.

Overview information may be included in the authorization request. The overview information may describe the website or application related to the access request. The overview information may include a rating or age recommendation for a website in the authorization request. The overview information may include a screenshot of the website in the authorization request.

The authorization request may be sent to a plurality of authorizing devices associated with the authorizing user. The authorization request may also include a user-selectable option to grant permission or deny permission to access the website or application. The authorization request may also include an option to grant permission or deny permission to access the website or application for a specific period of time.

The client device may be associated with a child. The authorizing user may be associated with a parent or caretaker of the child.

The method may be implemented by a cloud server configured to communicate with the router and at least one authorizing device associated with the authorizing user.

The method may also include sending the authorization request to a plurality of authorizing users. Access to the website or application may be based on a plurality of authorization responses received from the plurality of authorizing users.

When the authorization response grants permission to access the website or application, the router may add the website or application to a whitelist and permits the client device to access the website or application.

A cloud server is also described. The cloud server includes a processor and memory in electronic communication with the processor. Instructions stored in the memory are executable to receive an access request from a router, the router having received the access request from a client device, the client device initiating the access request to obtain access to a website or application. The instructions are also executable to send an authorization request to an authorizing user, the authorization request comprising the access request, thereby enabling the authorizing user to see information related to the access sought to be obtained. The instructions are further executable to receive an authorization response from the authorizing user. The instructions are additionally executable to send the authorization response to the router, enabling the router to act on the access request.

Another method is described. The method includes receiving an access request from a client device to obtain access to a website or application. The method also includes sending the access request to a cloud server. The cloud server sends an authorization request comprising the access request to an authorizing user, thereby enabling the authorizing user to see information related to the access sought to be obtained. The method further includes receiving, from the cloud server, an authorization response provided by the authorizing user. The method additionally includes acting on the access request based on the authorization response.

When the authorization response grants permission to access the website or application, acting on the access request may include adding the website or application to a whitelist. The client device may be permitted to access the website or application.

A router is also described. The router includes a processor and memory in electronic communication with the processor. Instructions stored in the memory are executable to receive an access request from a client device to obtain access to a website or application. The instructions are also executable to send the access request to a cloud server. The cloud server sends an authorization request comprising the access request to an authorizing user, thereby enabling the authorizing user to see information related to the access sought to be obtained. The instructions are further executable to receive, from the cloud server, an authorization response provided by the authorizing user. The instructions are additionally executable to act on the access request based on the authorization response.

The systems and methods described herein involve cloud-based network control. In an implementation, the described systems and methods may be used in a parent-child context to provide parental control of network resources. However, the same systems and methods can be applied in many other contexts. For example, in the employer-employee context, employers may want to block the application or website usage of their employees until there has been a specific authorization.

Previously, websites could be blocked by parents only locally on routers. The systems and methods herein describe remote parental control using the cloud. The described systems and methods enable users (e.g., parents or employers) to remotely grant or deny permissions for users such as children to access specific websites or applications. The described systems and methods may utilize cloud infrastructure, smart phones, and/or cloud-enabled routers to actively and remotely manage permissions.

In a particular implementation, a router may act as a proxy and intercept a connection to a network resource (e.g., a particular website). The router may delay the connection until a parent approves the request for the connection.

A cloud server may be responsible for obtaining an access request pending at the router. The cloud server may then send the access request over any number of means (e.g. SMS, email, phone app, making it available on a website, etc.) to the parent. The parent's authorizing device (e.g., smart phone or other device) can receive the access requests quickly and remotely. This can allow the parent to grant or deny the access requests. This process may happen essentially in real-time, and the parent can be presented with the option to grant or deny access almost immediately after the child has attempted access. This enables real-time, active parental control.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
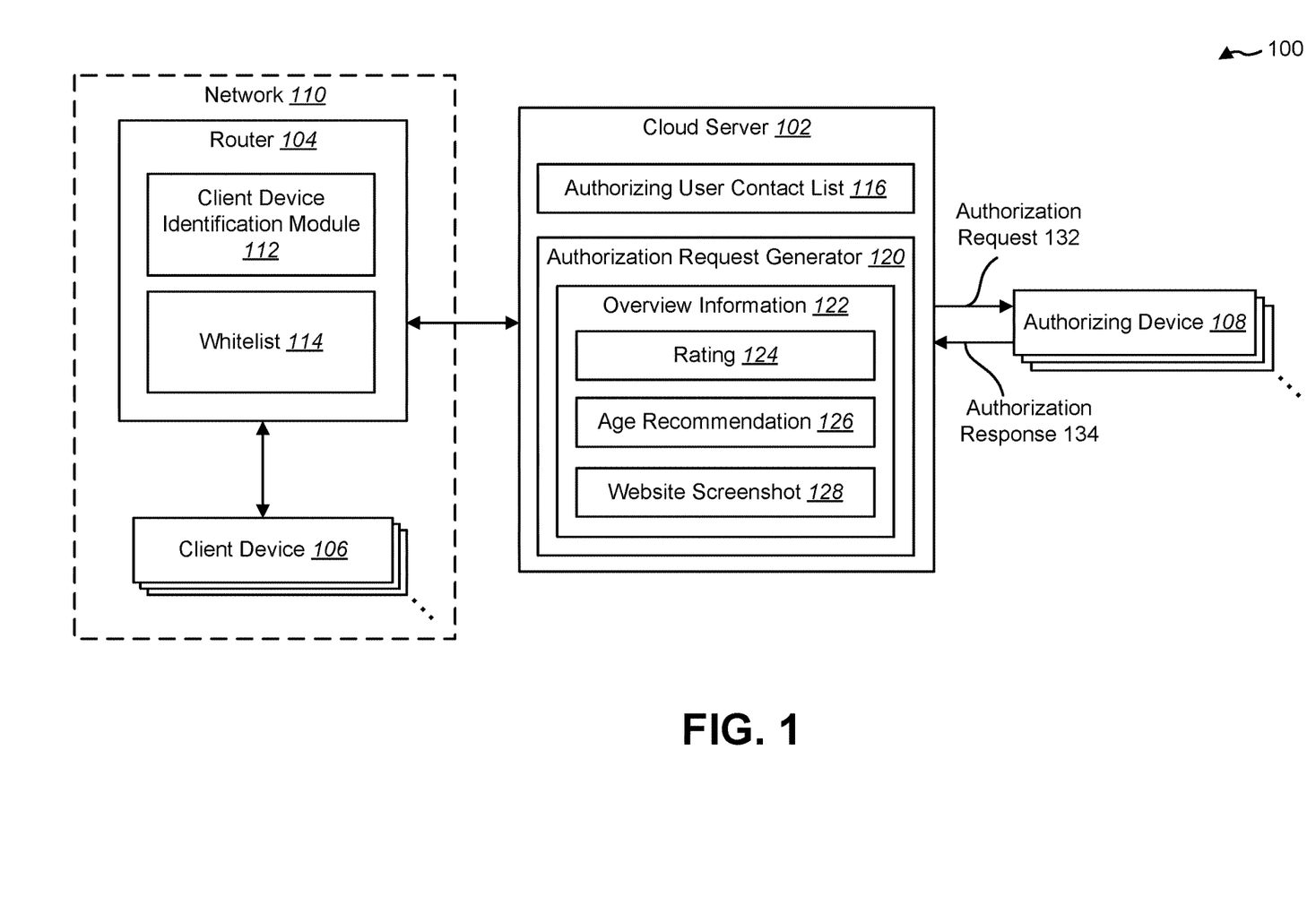
FIG. 1 is a block diagram of a cloud management system for providing cloud-based network control.

FIG. 1 is a block diagram of a cloud management system 100 for providing cloud-based network control. The cloud management system 100 may include a network 110 configured to communicate with a cloud server 102. The network 110 may include one or more routers 104 and one or more client devices 106. Examples of a client device 106 include desktop computers, laptop computers, tablet devices, netbooks, cellular phones, smart phones, routers, personal digital assistants (PDAs), etc.

The network 110 may be implemented may be implemented in one or more configurations. For example, the network 110 may be implemented as a local area network (LAN), a wireless LAN (WLAN), a personal area network (PAN), or a Wide Area Network (WAN), or other configuration. Devices within the network 110 may communicate using wired technologies (e.g., coaxial, Ethernet, fiber optic) or wireless technologies (e.g., microwave, radio frequency (RF) (e.g., cellular, Wifi, Bluetooth), infrared). In some implementations, the network 110 may be used within a residential home or a business enterprise.

The network 110 may include a router 104. The router 104 is a networking device that directs network traffic. The router 104 may be configured to communicate with the one or more client devices 106 within the network 110. The router 104 may provide access to network resources. For example, the router 104 may enable a client device 106 to connect to the Internet.

A user of a client device 106 may desire to connect to a website or an application with a client device 106. In some scenarios, it is beneficial to control access to the website or application. In a parent-child context, a child may use the client device 106 and one or more parents or caregivers may desire to supervise access on the client device 106. In the employer-employee context, employers may want to block the application or website usage of their employees until there has been a specific authorization.

In an approach, parental control software may be installed locally on a client device 106. A child may be provided with an account on the client device 106 into which the child may log in using unique credentials (e.g., username and password). The parental control software monitors the child's activities and permits or denies access to certain resources. For example, the parental control software may be configured to allow access to some websites and deny access to some or all other websites. Similarly, the parental control software may allow access to certain applications (e.g., programs or apps) installed on the client device 106 or located on a remote device, but may block other applications.

In this approach, an authorizing user may grant permission to a blocked website or application by authorizing the access. For example, if a child seeks to access a blocked website, a parent may enter an administrative password in the client device 106 to grant that access.

However, with this approach, problems may occur when a client (e.g., a child) seeks access to a blocked website or application and an authorizing user (e.g., a parent) is not present to authorize access. For example, while a child is at home working on homework, the child may need to access a blocked website. If the parent is away from home, the parent may not be able to authorize access to the website. In other scenarios, remote access to the client device 106 may be impossible or impractical for the parent to perform.

Another problem with network access control (in both a parental control and an employer-employee context) is providing useful information about the type of access being sought. For example, in the parental control context, simply having the uniform resource locator (URL) of a website may not provide enough information to make an informed decision as to whether to allow or deny access to a child.

The systems and methods described herein enable authorizing users (e.g., parents) to remotely grant or deny access for clients (e.g., children) to access specific websites or applications. The router 104 may be configured to communicate with a cloud server 102. The cloud server 102 may not be part of the network 110. For example, the cloud server 102 may be physically located outside the network 110. In an implementation, the cloud server 102 may be accessible to the router 104 over the Internet.

As used herein, the term "cloud" refers to an Internet-based computing network of one or more remote servers. The cloud server 102 may store, manage, and process data, rather than a local server or a personal computer.

The cloud server 102 may be configured to communicate with one or more authorizing devices 108. Authorizing devices 108 can be, as non-limiting examples, desktop computers, laptop computers, tablet devices, netbooks, cellular phones, smart phones, routers, or personal digital assistants (PDAs). Authorizing devices 108 do not need to be part of the network 110, although in some circumstances, they may be part of the network 110.

The router 104 may include a client device identification module 112 that identifies client devices 106 on the network 110. In an implementation, the client device identification module 112 may obtain the MAC addresses and IP addresses of the client devices 106. In another implementation, the client device identification module 112 may obtain the identity of the user of the client device 106 based on the login credentials provided by the user.

In an implementation, an authorizing user (or other user in control of the network 110, cloud server 102 or the cloud management system 100) can select identified client devices 106 and name them. The authorizing user or other user may also associate one or more specific client devices 106 with a particular user (e.g., child). The authorizing user or other user can then enable parental controls based on the client device 106, or can enable parental controls based on a user. For example, the router 104 or cloud server 102 can know if a child is attempting to access a website or application based on their login credentials, as opposed to based on the client device 106 that is being used.

The user may attempt to use a client device 106 to access websites or applications. The client device 106 may send an access request. The router 104 may be configured to intercept some or all access requests on the network 110. For example, the router 104 may act as a proxy (or proxy server) that is an intermediary for requests from client device 106. When the user is identified as being a child (or the client device 106 is identified as being associated with the child), the router 104 that is part of the network 110 may intercept all requests for access for that user.

In one implementation, the router 104 may block all websites and/or applications until there is specific authorization. The router 104 may maintain a whitelist 114 that includes websites or applications that have been granted access for the child. If a website or application is not included in the whitelist 114, access to that website or application may be blocked by the router 104.

Upon receiving an access request, the router 104 may determine whether the access request is coming from a particular user (e.g., child) or a client device 106 associated with the user. These access requests can be forwarded to the cloud server 102. The router 104 may also send information relating to the user of the client device 106 so that parental control can be implemented specific to that user.

In an implementation, the router 104 may provide a client message to the user of the client device 106 informing the user of the status of the access request. The client message may be displayed in a web browser or a dialog box on the client device 106. Examples of the client message generated by the router 104 are described in connection with FIGS. 4, 5A and 5B.

Upon receiving an access request from the router 104, the cloud server 102 may determine who the user (e.g., child) is that generated the access request. The cloud server 102 may then identify one or more authorizing users associated with that particular user.

In an implementation, the cloud server 102 may include an authorization request generator 120. The authorization request generator 120 may generate one or more authorization requests 132 based on the access request received from the router 104. The authorization request generator 120 may also generate the one or more authorization requests 132 based on information about the client device 106 and/or user of the client device 106.

The authorization request generator 120 may include the access request received from the router 104 in the authorization request 132. Examples of information that may be obtained from the access request include information about the user (e.g., child), the client device 106 that generated the access request, the type of access request (e.g., the URL of a website or name of an application) and time the access request was made.

The authorization request 132 may also include one or more user-selectable options. These user-selectable options may allow an authorizing user to select how to respond to the authorization request 132. For example, the user-selectable options may include an option to grant permission to access the website or application, deny permission, defer a decision or specify an amount of time to grant permission.

The authorization request generator 120 may also generate overview information 122 to supplement the access request information. The overview information 122 may include a rating 124 for the access request. For example, the cloud server 102 may obtain a rating 124 for a website from a rating service. The overview information 122 may also include an age recommendation 126 for the access request. The authorization request generator 120 may also generate a website screenshot 128 of the website that the user is seeking to access. Examples of an authorization request 132 are described in connection with FIGS. 6 and 7.

The cloud server 102 may send an authorization request 132 to an authorizing user. The authorizing user can be, as a non-limiting example, a parent. In another implementation, the authorizing user can be an employer or administrator.

The authorization request 132 can be sent to the authorizing user by many means. The cloud server 102 may send the authorization request 132 to one or more authorizing devices 108 using SMS, email, an application (e.g., app) installed on an authorizing device 108, a website or other communication means.

In an implementation, an application installed on the authorizing device 108 may be configured to communicate authorization requests 132 to the authorizing user. In this implementation, the application may be a standalone parental control program that is installed on the authorizing device 108. The application may be configured to receive authorization requests 132 from the cloud server 102. The application may also be configured to send authorization responses 134 back to the cloud server 102. The cloud server 102 may manage the communication among applications installed on a plurality of authorizing devices 108.

In an implementation, the cloud server 102 may maintain an authorizing user contact list 116 that includes information about the means to communicate the authorization request 132 to an authorizing user. For example, the authorizing user contact list 116 may include one or more phone numbers that can be used to send SMS messages to the authorizing user. The authorizing user contact list 116 may include one or more email addresses of the authorizing user. The authorizing user contact list 116 may include account information for an application installed on an authorizing device 108 that communicates the authorization request 132 to the authorizing user.

Upon receiving the authorization request 132 from the cloud server 102, the authorizing device 108 may present the authorization request 132 to the authorizing user. This may include displaying the authorization request 132 on the authorizing device 108 for the authorizing user. The authorizing user may be presented with the access request information and any additional overview information 122 that is included in the authorization request 132.

The authorizing user may review the authorization request 132 and decide how to respond. For example, in the parental control context, the parent can choose whether they want to grant their child permission. If they grant permission, they can specify whether they want to do so indefinitely or for a specific period of time. If they deny permission, they can specify whether to do it permanently or only temporarily. Furthermore, the authorizing user may choose to defer a decision indefinitely or for a specific period of time.

It should be noted that having a person review the authorization request 132 results in better and more secure results than if this decision was automated. A human is more capable than an automated process for making a discerning decision about whether access to a website or application is appropriate for a given user. An automated process may mistakenly grant access to inappropriate material or may deny access to appropriate material.

The authorizing user may input his or her decision about authorizing the access into the authorizing device 108. For example, the authorizing user may press a button in an application on the authorizing device 108. In another example, the authorizing user may reply to an SMS message or email with the access decision.

The authorizing device 108 may send an authorization response 134 to the cloud server 102. The authorization response 134 may include the access decision provided by the authorizing user. The cloud server 102 may store the authorization response 134. The cloud server 102 may forward the authorization response 134 to the router 104.

Upon receiving the authorization response 134 from the cloud server 102, the router 104 may act on the access request. When the authorization response 134 grants permission to access the website or application, the router 104 may permit the client device 106 to access the website or application. When the authorization response 134 denies permission to access the website or application, the router 104 may continue to block access to the website or application.

In an implementation, when the authorization response 134 grants permission to access the website or application, the router 104 may add the website or application to a whitelist 114. The whitelist 114 may include websites or applications that have been granted access. In an implementation, the whitelist 114 may indicate whether the website or application has been granted permission permanently or only temporarily. The router 104 may grant future access requests for websites or applications in the whitelist 114 without seeking authorization from the authorizing user.

The router 104 may update the client message provided to the user based on the authorization response 134 it receives. For example, if the authorization response 134 grants permission to access the website or application, then the client message may indicate permission was granted and that the user will be redirected to the website or application. If the authorization response 134 denies permission to access the website or application, then the client message may indicate that permission was denied.

In an implementation, granting of permission may be based on the authorization from more than one authorizing user. For example, the child could not access a website or an application until both parents grant access. In this implementation, the cloud server 102 may send the authorization request 132 to a plurality of authorizing users. The cloud server 102 may then determine whether it has received authorization responses 134 from each of the authorizing users before sending the authorization response 134 to the router 104.

In this implementation, in the event that there is a conflict in the authorization responses 134, the cloud server 102 may perform conflict resolution in a number of ways. In one approach, permission may be denied if any of the authorizing users deny permission. In another approach, permission may be granted if at least one authorizing user grants permission. In yet another approach, permission may be based on the last authorization response 134 received.

In an implementation, the cloud server 102 may inform other authorizing users of each authorization response 134 that it receives. For example, if one parent grants access, the cloud server 102 may notify the other parent of this decision.

The benefits of the described systems and methods include real-time active whitelisting of websites and applications using the cloud. This can be done remotely using any number of authorization devices 108. There may be multiple authorizations required for a whitelist 114, which may ensure safety and consistency. Control of the cloud management system 100 (e.g., the cloud server 102 and the router 104) enables an integrated implementation that is streamlined and easily manageable.

Figure 2:
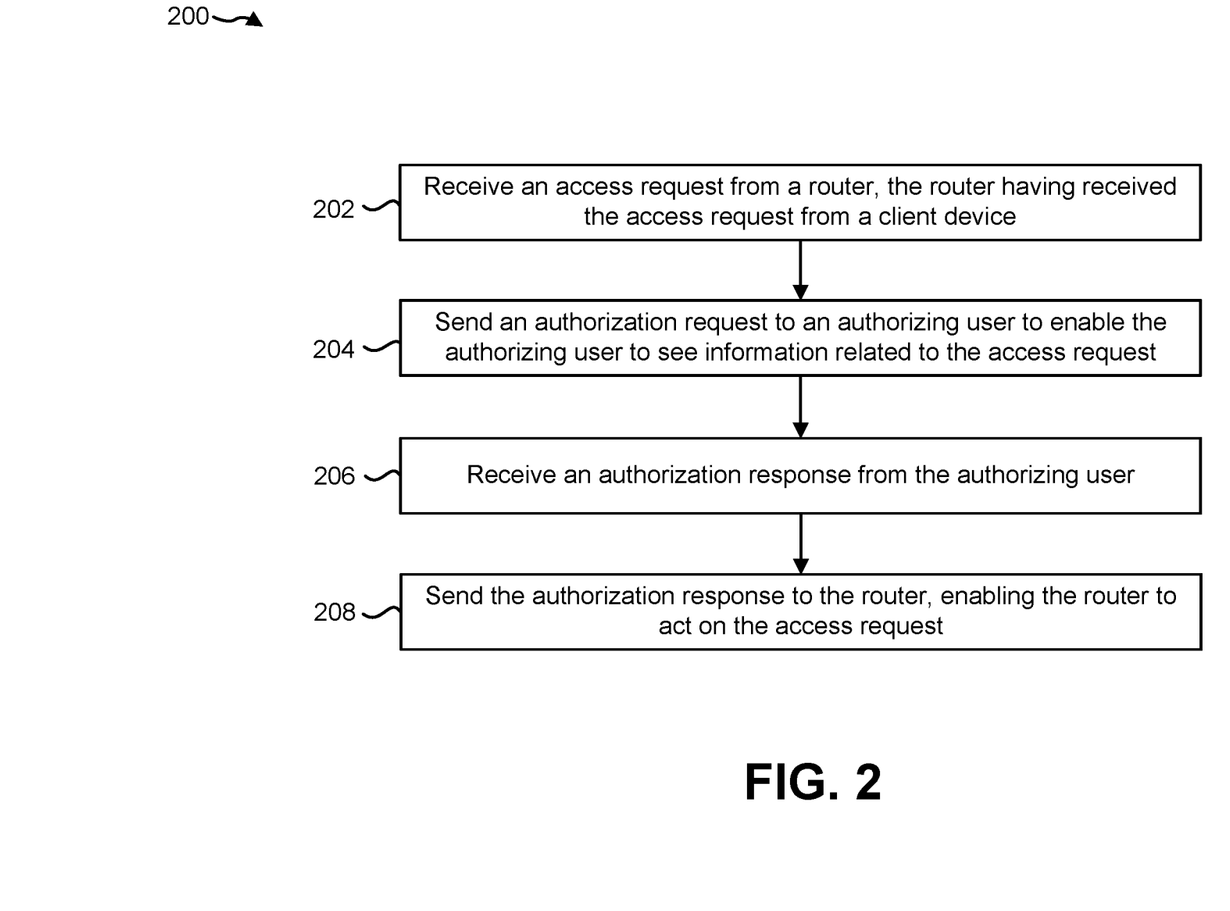
FIG. 2 is a flow diagram illustrating one configuration of a method for cloud-based network control by a cloud server.

FIG. 2 is a flow diagram illustrating one configuration of a method 200 for cloud-based network control by a cloud server 102. The cloud server 102 may be configured to communicate with a router 104 and at least one authorizing device 108 associated with an authorizing user.

The cloud server 102 may receive 202 an access request from a router 104. The router 104 may have received the access request from a client device 106. In a parental control context, the client device 106 may be associated with a child and the authorizing user may be associated with a parent or caretaker of the child. The client device 106 may initiate the access request to obtain access to a website or application.

The cloud server 102 may send 204 an authorization request 132 to an authorizing user. The authorization request 132 may include the access request. This may enable the authorizing user to see information related to the access sought to be obtained. The authorization request 132 may be sent 204 to at least one of a plurality of authorizing devices 108 associated with the authorizing user. The cloud server 102 may send 204 the authorization request 132 using any number of means (e.g., SMS, email, phone app, making it available on a website).

The cloud server 102 may also include overview information 122 in the authorization request 132 that describes the website or application related to the access request. For example, the cloud server 102 may include a rating 124 or age recommendation 126 for a website in the authorization request 132. The cloud server 102 may also include a screenshot 128 of the website in the authorization request 132.

The authorization request 132 may also include a user-selectable option to grant permission or deny permission to access the website or application. In an implementation, the option to grant permission or deny permission to access the website or application may be for a specific period of time, as indicated by the authorizing user.

The cloud server 102 may receive 206 an authorization response 134 from the authorizing user. For example, an authorizing device 108 may receive a decision from the authorizing user regarding access to the website or application. The authorizing device 108 may send the authorization response 134 to the cloud server 102. The authorizing user may grant or deny permission. The authorizing user may also specify an amount of time to grant or deny permission.

The cloud server 102 may send 208 the authorization response 134 to the router 104, enabling the router 104 to act on the access request. For example, when the authorization response 134 grants permission to access the website or application, the router 104 may permit the client device 106 to access the website or application. The router 104 may add the website or application to a whitelist 114 for future access requests.

Figure 3:
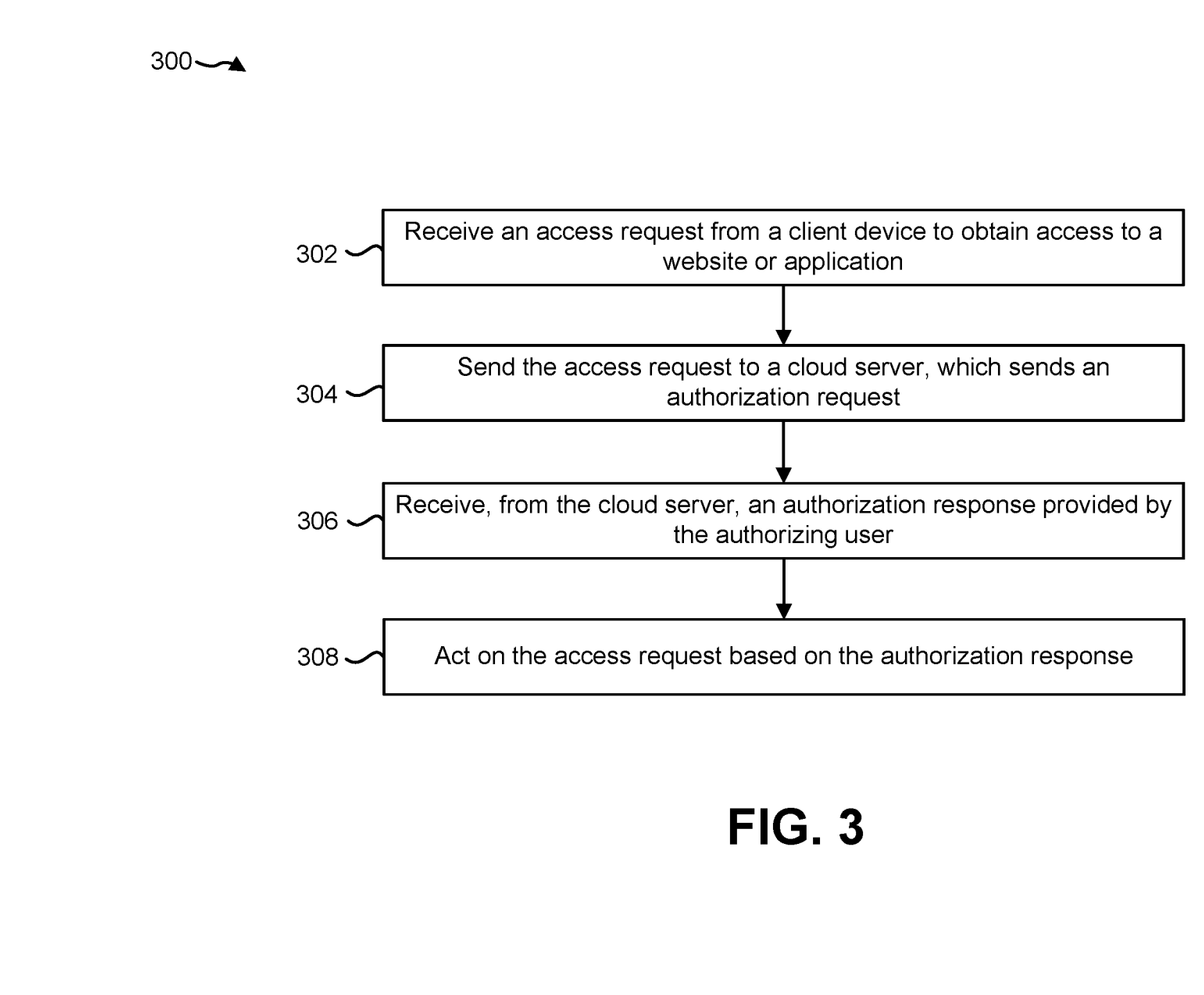
FIG. 3 is a flow diagram illustrating one configuration of a method for cloud-based network control by a router.

FIG. 3 is a flow diagram illustrating one configuration of a method 300 for cloud-based network control by a router 104. The router 104 may be configured to communicate with one or more client devices 106 in a network 110 and a cloud server 102.

The router 104 may receive 302 an access request from a client device 106 to obtain access to a website or application. The router 104 may send 304 the access request to the cloud server 102. The cloud server 102 may send an authorization request 132 that includes the access request to an authorizing user, thereby enabling the authorizing user to see information related to the access sought to be obtained. This may be accomplished as described in connection with FIG. 2.

The router 104 may receive 306, from the cloud server 102, an authorization response 134 provided by the authorizing user. For example, an authorizing device 108 may send the authorization response 134 to the cloud server 102, which forwards the authorization response 134 to the router 104.

The router 104 may act 308 on the access request based on the authorization response. For example, when the authorization response 134 grants permission to access the website or application, the router 104 may permit the client device 106 to access the website or application. In this case, the router 104 may add the website or application to a whitelist 114 for future access requests. If the authorization response 134 denies permission to access the website or application, the router 104 may block the client device 106 from accessing the website or application.

Figure 4:
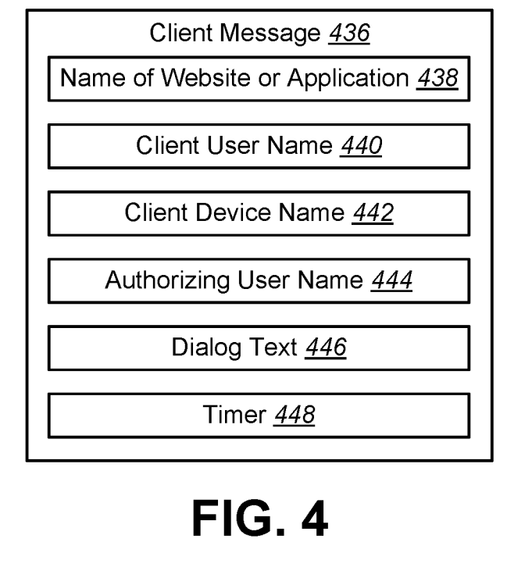
FIG. 4 is a block diagram illustrating a configuration of a client message.

FIG. 4 is a block diagram illustrating a configuration of a client message 436. As described above, the client message 436 may be generated by a router 104 in response to an access request made by a client device 106. The client message 436 may inform the user of the client device 106 of the access request status. The client message 436 may be displayed in a web browser or a dialog box on the client device 106.

In an implementation, the client message 436 may include dialog text 446 that indicates to the user that the access request is pending. Upon receiving an authentication response 134, the dialog text 446 may be updated to reflect the result of the authentication.

The client message 436 may also include additional information. The client message 436 may include the name 438 of the website or application for which access is sought. For example, the client message 436 may list the URL of the website that the user wishes to access.

The client message 436 may include the client user name 440 (e.g., the name of the child as determined by login credentials or association with the client device 106). The client message 436 may also include the client device name 442 as provided by the authorizing user. The client message 436 may include the authorizing user name 444.

The client message 436 may also include a timer 448. The timer 448 may start when the access request is received. The timer 448 may stop when the router 104 receives an authentication response 134.

Figure 5A:
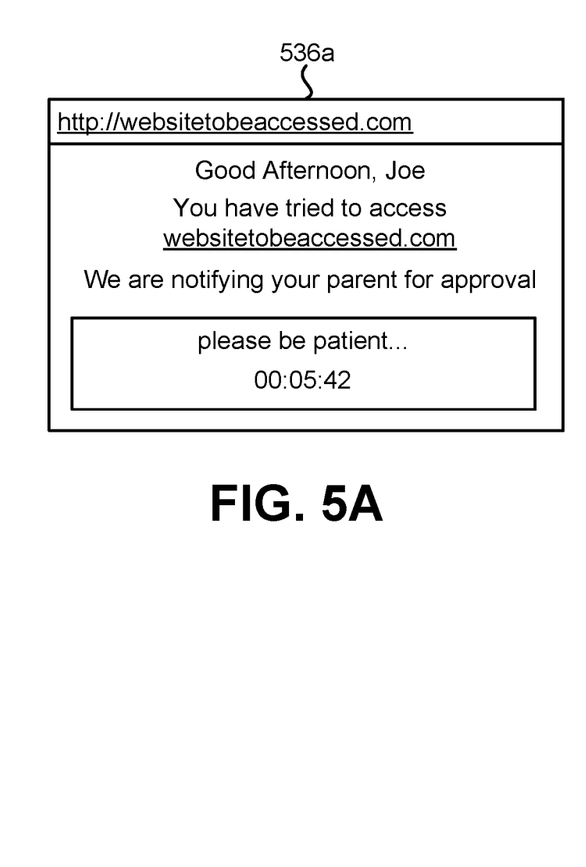
FIG. 5A is an example of a client message that can be displayed on a client device while a request for access is pending.

FIG. 5A is an example of a client message 536a that can be displayed on a client device 106 while a request for access is pending. In this example, the user is told that an authorization request 132 was sent to an authorizing user for the granting or denial of permission. In this implementation, a timer 448 is shown, measuring the amount of time that has elapsed since the authorization request 132 was sent to the authorizing user.

In this example, the name 438 of the website is "http://websitetobeaccessed.com". It should be noted that this is a non-limiting example of a website to which the client user may seek access. Other network resources may also be the subject of an access request. For example, the client user may seek access to a secure website (e.g., https) or other resource.

Figure 5B:
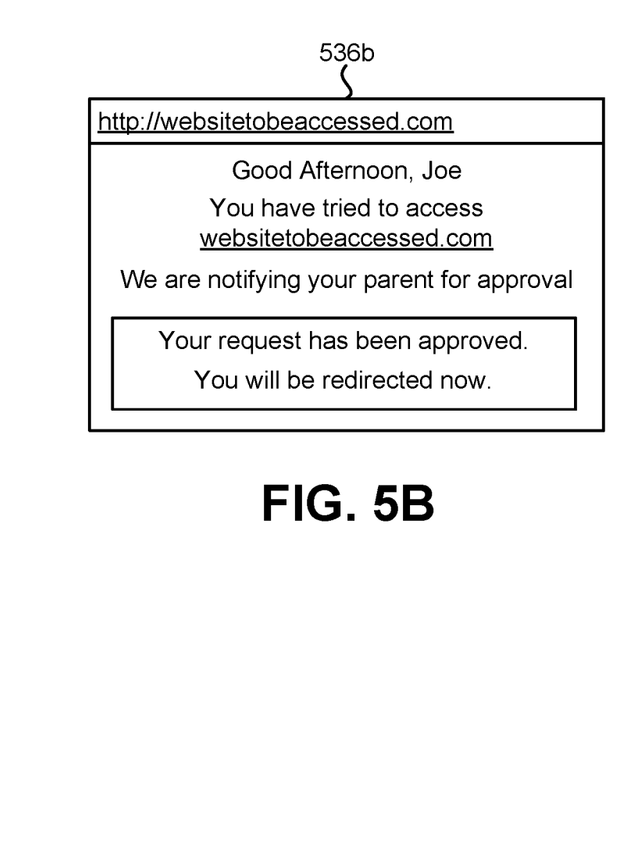
FIG. 5B is an example of a client message that can be displayed on a client device after a request for access has been approved.

FIG. 5B is an example of a client message 536b that can be displayed on a client device 106 after a request for access has been approved. In this example, the user is told that the authorization request 132 was approved and will be redirected to the requested website.

Figure 6:
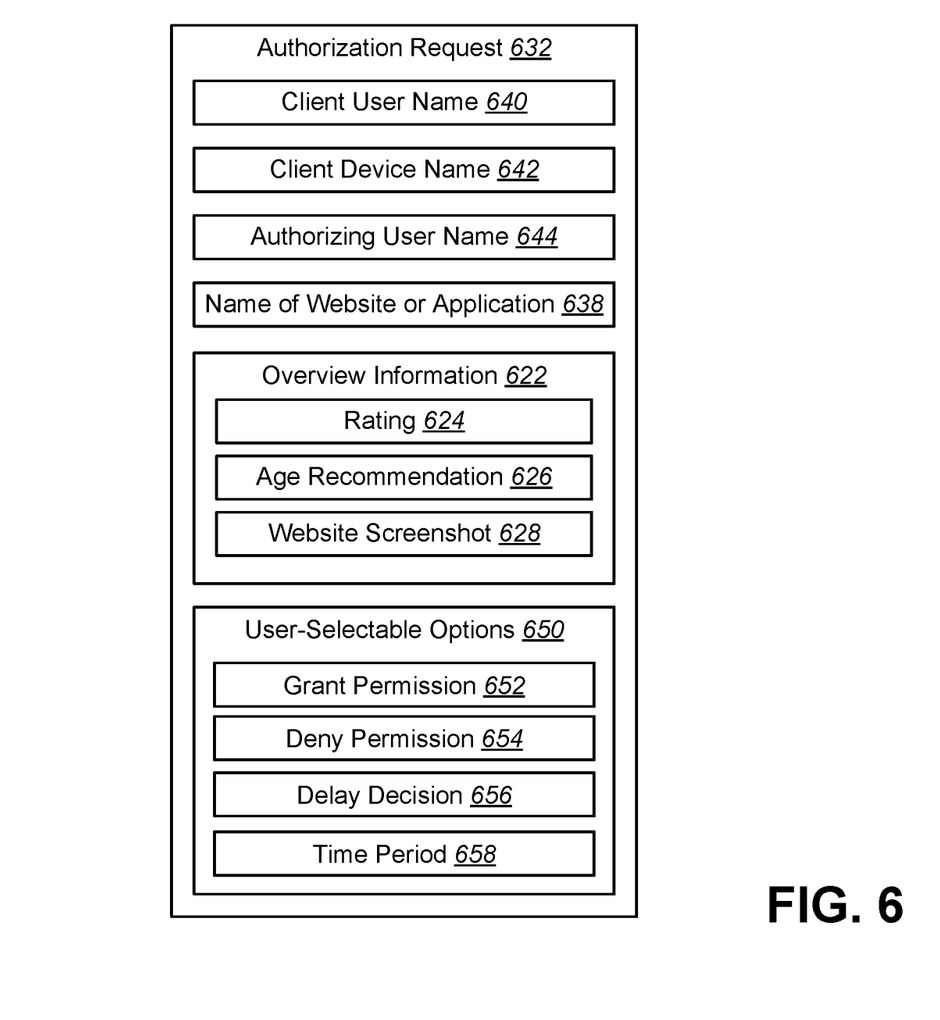
FIG. 6 is a block diagram illustrating a configuration of an authorization request.

FIG. 6 is a block diagram illustrating a configuration of an authorization request 632. As described above, the authorization request 632 may be generated by a cloud server 102 in response to receiving an access request from a router 104. The authorization request 632 may inform an authorizing user of the access request. The authorization request 632 may be displayed on the authorizing device 108.

The authorization request 632 may include information obtained from the access request. This may include the name 638 of the website or application for which access is sought, the client user name 640 and the client device name 642.

The authorization request 632 may also include the authorizing user name 644 and overview information 622. The overview information 622 may include a rating 624, age recommendation 626 and a website screenshot 628.

The authorization request 632 may also include user-selectable options 650 that provide the authorizing user one or more ways to respond to the authorization request 632. The user-selectable options 650 may include grant permission 652, deny permission 654, delay a decision 656 and a time period 658 for which a given decision is effective (e.g., temporarily or permanently).

Figure 7:
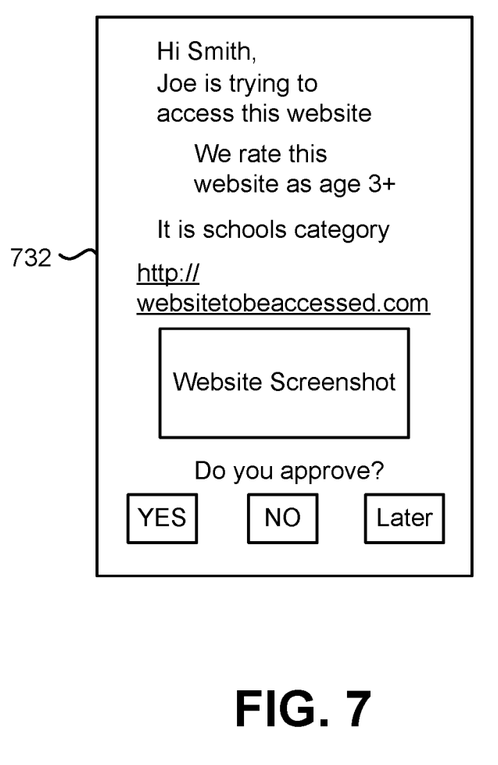
FIG. 7 is an example of an authorization request that can be displayed on an authorizing device.

FIG. 7 is an example of an authorization request 732 that can be displayed on an authorizing device 108. In this example, the authorizing user ("Smith") is told that a user ("Joe") is trying to access a website. The authorization request 732 includes an age recommendation 126, a classification and a screenshot 128 of the website. In an implementation, the web site screenshot 128 can be obtained and sent to the authorizing user before the child has seen the website.

The authorizing user is presented with options to grant or deny access. Other options can include, as non-limiting examples, specifying a time period for which the permission is effective, or choosing to make the decision later.

Figure 8:
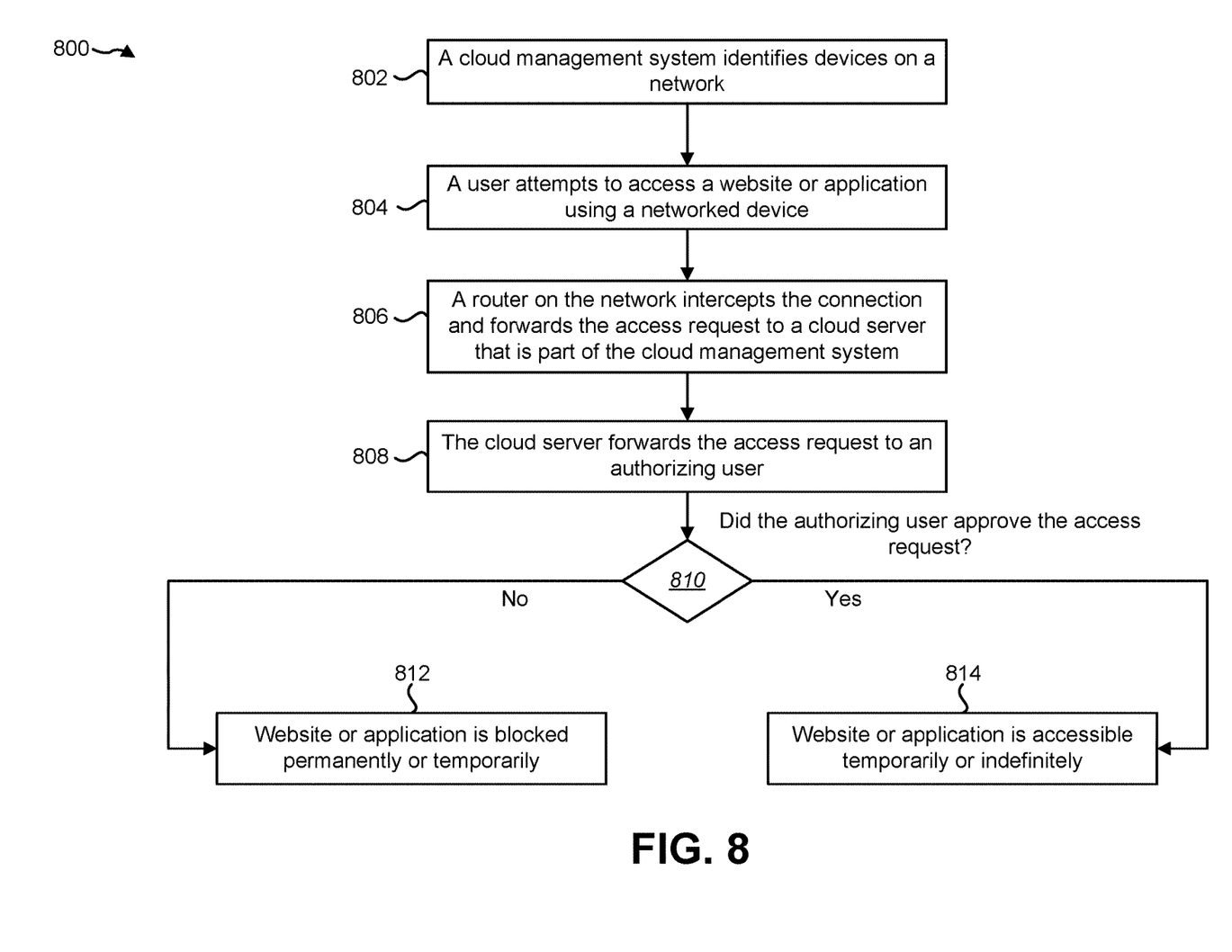
FIG. 8 is a flow diagram illustrating a method for performing cloud-based network control.

FIG. 8 is a flow diagram illustrating a method 800 for performing cloud-based network control. The method 800 may be implemented in a cloud management system 100. The cloud management system 100 may include at least one router 104 and at least one cloud server 102.

In step 802, the cloud management system 100 may identify devices on a network 110. For example, the router 104 may obtain the MAC addresses and IP addresses of client devices 106 within a network 110.

In step 804, a user may attempt to access a website or application using a client device 106. For example, a child may attempt to access a website using a client device 106 that is connected to the network 110.

In step 806, a router 104 on the network 110 intercepts the connection and forwards the access request to a cloud server 102. In an implementation, all websites and/or applications are blocked by the router 104 until there is specific authorization. It should be noted that the router 104 that intercepts the access request made by the client device 106 may or may not be the same device that performs the identification of networked devices of step 802. The cloud server 102 may not be on the same network 110 as the router 104. For example, the cloud server 102 may communicate with the router 104 over the Internet.

In step 808, the cloud server 102 forwards the access request to an authorizing user. The cloud server 102 may include the access request in an authorization request 132. The cloud server 102 may also include overview information 122 in the authorization request 132. This overview information 122 may include a rating 124, age recommendation 126 and a website screenshot 128.

In step 810, the cloud management system 100 determines whether the authorizing user approved the access request. For example, the cloud server 102 may receive an authorization response 134 from an authorizing device 108. The authorization response 134 may indicate whether the authorizing user approved the access.

If the authorizing user does not approve the access request, then in step 812, the website or application is blocked permanently or temporarily. The router 104 may continue to deny access to the website or application.

If the authorizing user approves the access request, then in step 814, the website or application is accessible temporarily or indefinitely. In this case, the router 104 may add the website or application to a whitelist 114 for this and future access requests.

Figure 9:
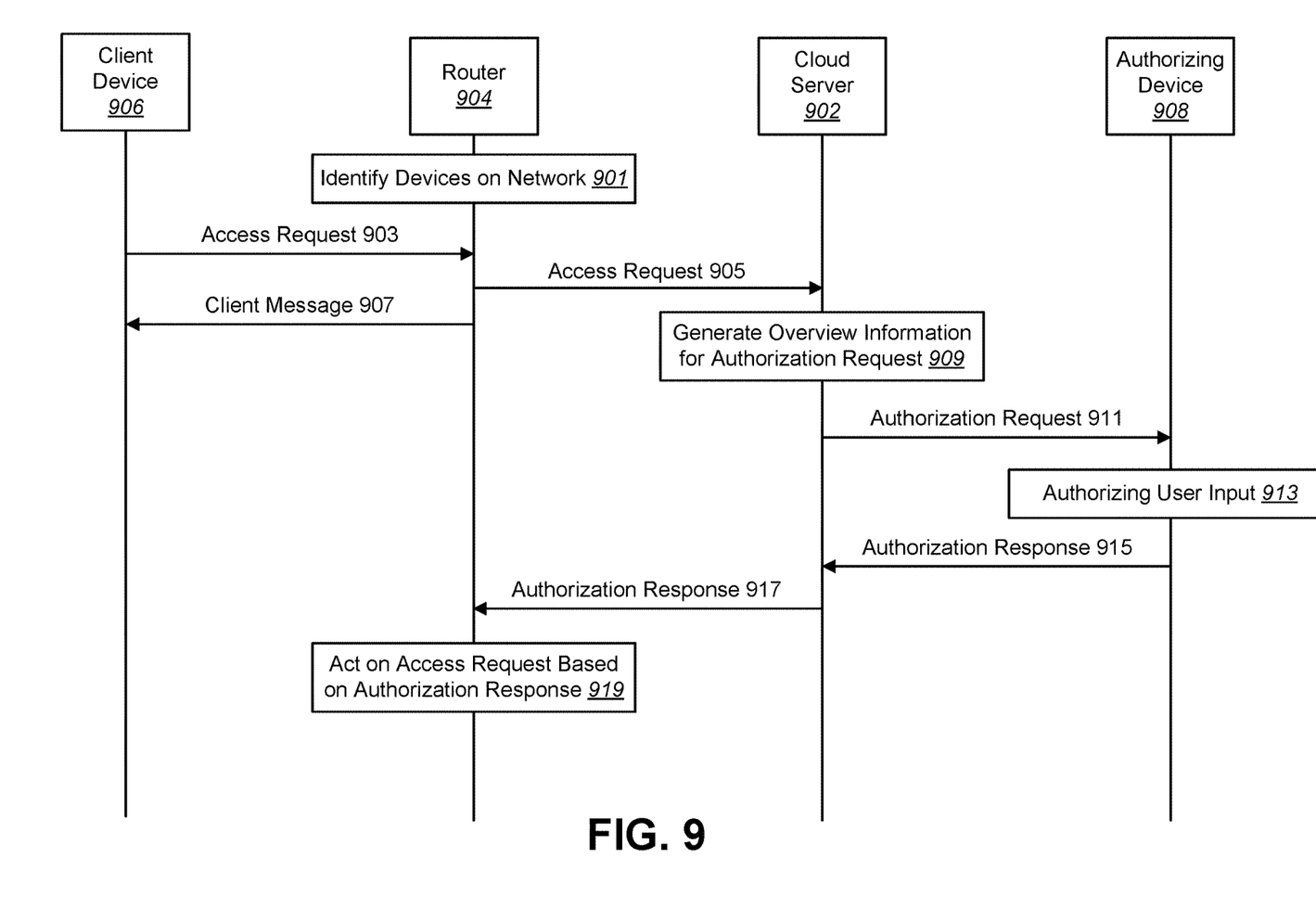
FIG. 9 is a sequence diagram illustrating one implementation of cloud-based network control.

FIG. 9 is a sequence diagram illustrating one implementation of cloud-based network control. A router 904 may identify 901 devices on a network 110. The router 904 may obtain the MAC addresses and IP addresses of one or more client devices 106 in the network 110. In another implementation, the router 904 may obtain the identity of the user of the client device 906 based on the login credentials provided by the user.

The client device 906 may send 903 an access request for a website or application. The router 904 may intercept the access request and forward 905 the access request to the cloud server 902. The router may send 907 a client message 436 to the client device 906 to inform the user of the client device 906 of the access request status.

Upon receiving the access request from the router 904, the cloud server 902 may generate 909 overview information 122 to supplement the access request information. The overview information 122 may include a rating 124 for the access request, an age recommendation 126 and/or a website screenshot 128.

The cloud server 902 may send 911 an authorization request 132 to an authorizing device 908. The authorization request 132 may include the access request information and the overview information 122.

The authorization device 908 may receive 913 a decision about the access request from an authorizing user. For example, an authorizing user may indicate whether to grant access or deny access to the website or application. The authorization device 908 may send 915 an authorization response 134 to the cloud server 902. The cloud server 902 may forward 917 the authorization response 134 to the router 904.

The router 904 may act 919 on the access request based on the authorization response. For example, if the authorization response 134 does not approve the access request, then the router 904 may continue to deny access to the website or application. If the authorization response 134 grants access to the website or application, then the router 904 may allow the client device 906 to connect to the website or application. The router 904 may also add the website or application to a whitelist 114 for this and future access requests.

Figure 10:
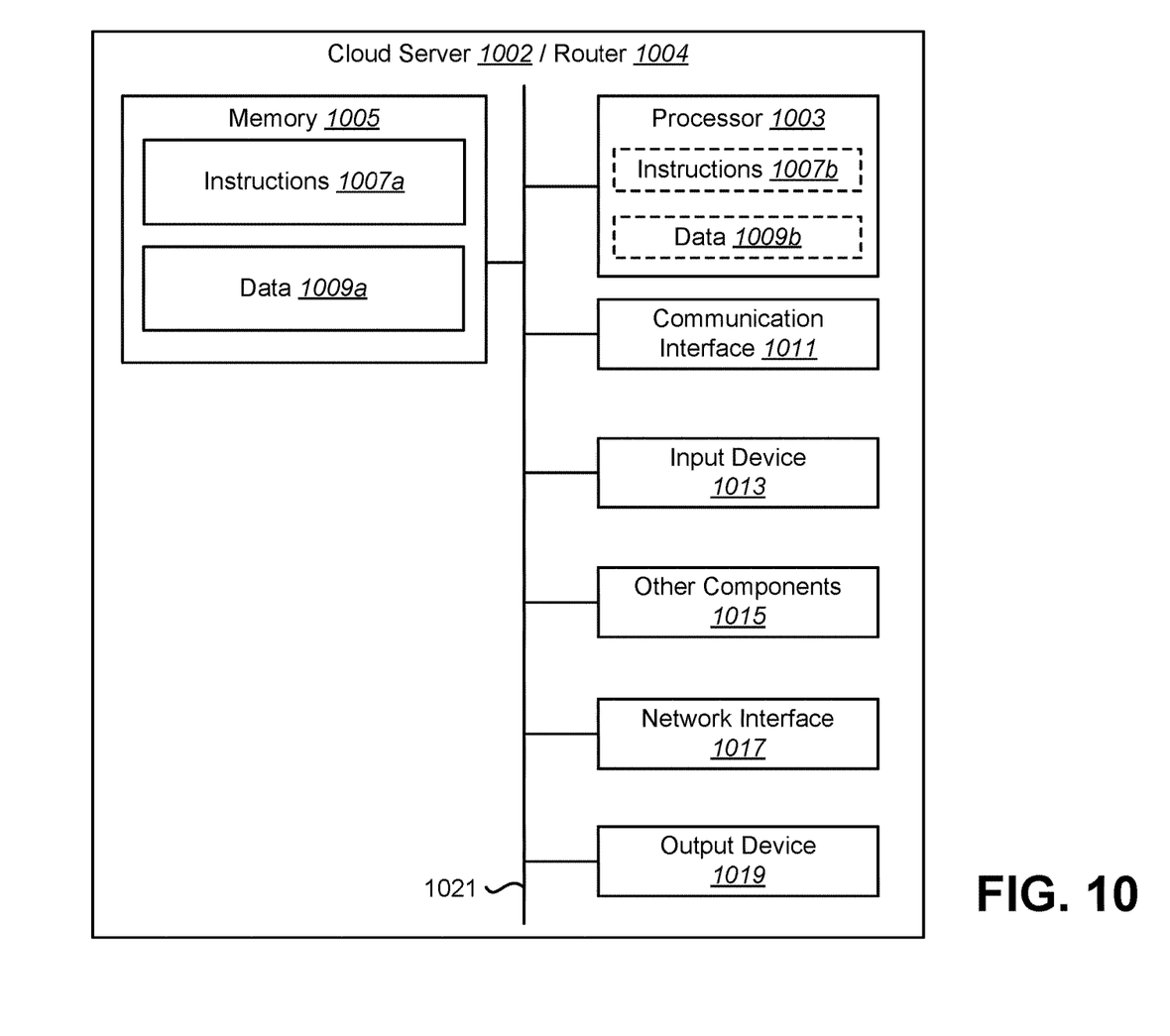
FIG. 10 is a block diagram illustrating various components that may be utilized in a cloud server and/or a router.

FIG. 10 is a block diagram illustrating various components that may be utilized in a cloud server 1002 and/or a router 1004. Although only the cloud server 1002 and/or the router 1004 are shown, the configurations herein may be implemented in a distributed system using many electronic devices. A cloud server 1002 and/or a router 1004 may include a broad range of digital computers, including microcontrollers, hand-held computers, personal computers, servers, mainframes, supercomputers, minicomputers, workstations and any variation or related device thereof. In some configurations, the cloud server 1002 and/or the router 1004 may be appliances. Additionally or alternatively, the cloud server 1002 and/or the router 1004 may be an embedded device inside an otherwise complete device (e.g., within an appliance).

The cloud server 1002 and/or the router 1004 is/are shown with a processor 1003 and memory 1005. The processor 1003 may control the operation of the cloud server 1002 and/or the router 1004 and may be embodied as a microprocessor, a microcontroller, a digital signal processor (DSP) or other device known in the art. The processor 1003 typically performs logical and arithmetic operations based on program instructions 1007a and/or data 1009a stored within the memory 1005. The instructions 1007a in the memory 1005 may be executable to implement the methods described herein. FIG. 10 illustrates instructions 1007b and/or data 1009b being loaded onto the processor 1003. The instructions 1007b and/or data 1009b may be the instructions 1007a and/or data 1009a (or portions thereof) stored in memory 1005.

The cloud server 1002 and/or the router 1004 may also include one or more communication interfaces 1011 and/or network interfaces 1017 for communicating with other electronic devices. The communication interface(s) 1011 and the network interface(s) 1017 may be based on wired communication technology and/or wireless communication technology, such as ZigBee®, WiMax®, WiFi®, Bluetooth® and/or cellular protocols, such as GSM®, etc.

The cloud server 1002 and/or the router 1004 may also include one or more input devices 1013 and one or more output devices 1019. The input devices 1013 and output devices 1019 may facilitate user input/user output. Other components 1015 may also be provided as part of the cloud server 1002 and/or the router 1004.

Instructions 1007a and data 1009a may be stored in the memory 1005. The processor 1003 may load and execute instructions 1007b from the instructions 1007a in memory 1005 to implement various functions. Executing the instructions 1007a may involve the use of the data 1009a that is stored in the memory 1005. The instructions 1007b and/or data 1009b may be loaded onto the processor 1003. The instructions 1007 are executable to implement the one or more methods shown herein and the data 1009 may include one or more of the various pieces of data described herein.

The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the cloud server 1002 and/or the router 1004 may be coupled together by a bus system 1021, which may include a power bus, a control signal bus and a status signal bus, in addition to a data bus. However, for the sake of clarity, the various buses are illustrated in FIG. 10 as the bus system 1021.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:
1. A method comprising:
  receiving an access request from a residential home, a local network router at the residential home having received the access request from a client device on the local network, the client device initiating the access request to obtain access to a website or application blocked by the local network router:

generating overview information that describes the website or application related to the access request, the overview information being generated for presentation on an authorizing device;

sending an authorization request to the authorizing user, the authorization request comprising the overview information and the access request including a uniform resource locator of the website or a name of the application, thereby enabling the authorizing user to see information related to the access sought to be obtained;

sending a client message to the client device to inform a user of the client device about a status of the access request while the access request is pending, wherein the client message comprises a name of the website or application, a client user name, a client device name, an authorizing user name and a timer that is started when the access request is received;

receiving an authorization response from the authorizing user;

sending the authorization response to the residential home, enabling the local network router at the residential home to act on the access request from the client device on the local network; and updating the client message to reflect the status of the access request in response to receiving the authorization response from the authorizing user.

2. The method of claim 1, wherein including the overview information comprises:

including a rating or age recommendation for a website in the authorization request; and including a screenshot of the website in the authorization request.

3. The method of claim 1, wherein the authorization request is sent to a plurality of authorizing devices associated with the authorizing user.

4. The method of claim 1, wherein the authorization request further comprises a user-selectable option to grant permission or deny permission to access the website or application.

5. The method of claim 1, wherein the authorization request further comprises an option to grant permission or deny permission to access the website or application for a specific period of time.

6. The method of claim 1, wherein the client device is associated with a child and the authorizing user is associated with a parent or caretaker of the child.

7. The method of claim 1, wherein the method is implemented by a cloud server configured to communicate with the router and at least one authorizing device associated with the authorizing user.

8. The method of claim 1, further comprising sending the authorization request to a plurality of authorizing users, wherein access to the website or application is based on a plurality of authorization responses received from the plurality of authorizing users.

9. The method of claim 1, wherein when the authorization response grants permission to access the website or application, the router adds the website or application to a whitelist and permits the client device to access the website or application.

10. A cloud server, comprising:
a processor; and
memory in electronic communication with the processor, wherein
instructions stored in the memory are executable to:

receive an access request from a residential home, a local network router at the residential home having received the access request from a client device on the local network, the client device initiating the access request to obtain access to a website or application blocked by the local network router;

generate overview information that describes the website or application related to the access request, the overview information being generated for presentation on an authorizing device;

send an authorization request to the authorizing user, the authorization request comprising the overview information and the access request including a uniform resource locator of the website or a name of the application, thereby enabling the authorizing user to see information related to the access sought to be obtained;

send a client message to the client device to inform a user of the client device about a status of the access request while the access request is pending, wherein the client message comprises a name of the website or application, a client user name, a client device name, an authorizing user name and a timer that is started when the access request is received;

receive an authorization response from the authorizing user;

send the authorization response to the residential home, enabling the local network router at the residential home to act on the access request from the client device on the local network; and update the client message to reflect the status of the access request in response to receiving the authorization response from the authorizing user.

11. The cloud server of claim 10, wherein the instructions executable to include the overview information comprise instructions executable to:

include a rating or age recommendation for a web site in the authorization request; and include a screenshot of the website in the authorization request.

12. The cloud server of claim 10, wherein the authorization request is sent to a plurality of authorizing devices associated with the authorizing user.

13. The cloud server of claim 10, wherein the authorization request further comprises a user-selectable option to grant permission or deny permission to access the website or application.

14. The cloud server of claim 10, wherein the client device is associated with a child and the authorizing user is associated with a parent or caretaker of the child.

15. The cloud server of claim 10, further comprising instructions executable to send the authorization request to a plurality of authorizing users, wherein access to the website or application is based on a plurality of authorization responses received from the plurality of authorizing users.

16. A method comprising:
receiving an access request from a client device on a local network to obtain access to a website or application blocked by a local network router;

sending, from the local network at a residential home, the access request to a cloud server outside of the local network, wherein the cloud server generates overview information that describes the website or application related to the access request, the overview information being generated with for presentation on an authorizing device, and sends an authorization request comprising the overview information and the access request including a uniform resource locator of the website or a name of the application to an authorizing user, thereby enabling the authorizing user to see information related to the access sought to be obtained;

sending a client message to the client device to inform a user of the client device about a status of the access request while the access request is pending, wherein the client message comprises a name of the website or application, a client user name, a client device name, an authorizing user name and a timer that is started when the access request is received;

receiving on the local network at the residential home, from the cloud server, an authorization response provided by the authorizing user;

acting on the access request based on the authorization response; and updating the client message to reflect the status of the access request in response to receiving the authorization response from the authorizing user.

17. The method of claim 16, wherein the overview information comprises a rating or age recommendation for a website, and a screenshot of the website.

18. The method of claim 16, wherein the authorization request is sent to a plurality of authorizing devices associated with the authorizing user.

19. The method of claim 16, wherein the authorization request further comprises a user-selectable option to grant permission or deny permission to access the website or application.

20. The method of claim 16, wherein the authorization request is sent by the cloud server to a plurality of authorizing users, wherein access to the website or application is based on a plurality of authorization responses received from the plurality of authorizing users.

21. The method of claim 16, wherein when the authorization response grants permission to access the website or application, acting on the access request comprises:
adding the website or application to a whitelist; and
permitting the client device to access the website or application.

22. A router, comprising:
a processor; and
memory in electronic communication with the processor, wherein
instructions stored in the memory are executable to:
receive an access request from a client device on a local network to obtain access to a website or application blocked by the router;
send, from the local network at a residential home, the access request to a cloud server outside of the local network, wherein the cloud server generates overview information that describes the website or application related to the access request, the overview information being generated for presentation on an authorizing device, and
sends an authorization request comprising the overview information and the access request including a uniform resource locator of the website or a name of the application to an authorizing user, thereby enabling the authorizing user to see information related to the access sought to be obtained;
send a client message to the client device to inform a user of the client device about a status of the access request while the access request is pending, wherein the client message comprises a name of the website or application, a client user name, a client device name, an authorizing user name and a timer that is started when the access request is received;
receive on the local network at the residential home, from the cloud server, an authorization response provided by the authorizing user;
act on the access request based on the authorization response; and
update the client message to reflect the status of the access request in response to receiving the authorization response from the authorizing user.

23. The router of claim 22, wherein the overview information comprises a rating or age recommendation for a website, and a screenshot of the website.

24. The router of claim 22, wherein the authorization request further comprises a user-selectable option to grant permission or deny permission to access the website or application.

25. The router of claim 22, wherein the authorization request is sent by the cloud server to a plurality of authorizing users, wherein access to the website or application is based on a plurality of authorization responses received from the plurality of authorizing users.

26. The router of claim 22, wherein when the authorization response grants permission to access the website or application, the instructions executable to act on the access request comprise instructions executable to:
add the website or application to a whitelist; and
permit the client device to access the website or application.

* * * * *

UNITED STATES PATENT AND TRADEMARK OFFICE
CERTIFICATE OF CORRECTION

| | |
|---|---|
| PATENT NO. | : 11,082,428 B2 |
| APPLICATION NO. | : 15/065451 |
| DATED | : August 3, 2021 |
| INVENTOR(S) | : Mina Farah |

Page 1 of 1

It is certified that error appears in the above-identified patent and that said Letters Patent is hereby corrected as shown below:

In the Specification

In Column 11, Line 5, please delete "web site" and replace it with --website--

In the Claims

In Column 14, Line 67, please delete ":" and replace it with --;--

In Column 16, Line 37, please delete "web site" and replace it with --website--

In Column 16, Line 66, please delete "with"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*